(12) United States Patent
Uchida et al.

(10) Patent No.: US 6,378,848 B1
(45) Date of Patent: Apr. 30, 2002

(54) GAS SPRING APPARATUS

(75) Inventors: Takeshi Uchida; Takeyoshi Shimbori, both of Yokohama (JP)

(73) Assignee: NKH Spring Co., Ltd., Yokohama (JP)

( * ) Notice: Subject to any disclaimer, the term of this patent is extended or adjusted under 35 U.S.C. 154(b) by 0 days.

(21) Appl. No.: 09/610,296

(22) Filed: Jul. 5, 2000

(30) Foreign Application Priority Data

Jul. 8, 1999 (JP) .......................................... 11-194473

(51) Int. Cl.[7] .................................................. F16F 9/22
(52) U.S. Cl. ................................. 267/64.25; 267/64.27
(58) Field of Search ........................... 267/64.25, 64.19, 267/64.23, 64.27, 64.14

(56) References Cited

U.S. PATENT DOCUMENTS

| | | | | |
|---|---|---|---|---|
| 3,077,345 A | * | 2/1963 | Andersson | 267/64.25 |
| 3,112,923 A | * | 12/1963 | Ley | 267/64.25 |
| 3,610,605 A | * | 10/1971 | Cornelius | 267/64.25 |
| 4,746,106 A | * | 5/1988 | Fukumura | 267/64.22 |
| 4,828,231 A | * | 5/1989 | Fukumura et al. | 267/64.23 |
| 4,858,898 A | * | 8/1989 | Niikura et al. | 267/64.28 |
| 5,098,071 A | * | 3/1992 | Umetsu | 267/64.27 |

FOREIGN PATENT DOCUMENTS

| | | | |
|---|---|---|---|
| AT | 264217 | * | 8/1968 |
| EP | 0 353 703 | | 2/1990 |
| GB | 2 164 119 | | 3/1986 |
| GB | 2164119 A | * | 3/1986 |
| JP | 6-16068 | | 1/1994 |
| JP | 6-62070 | | 8/1994 |

OTHER PUBLICATIONS

Patent Abstracts of Japan, vol. 1995, No. 09, Oct. 31, 1995 & JP 07–156699A (East Japan Railway Co.; Others: 01), Jun. 20, 1995—Abstract only.
Patent Abstracts of Japan, vol. 1998, No. 03, Feb. 27, 1998 & JP 09–288023A (Central Japan Railway Co.; Dengiyou: KK; NHK Spring Co., Ltd.), Nov. 4, 1997—Abstract only.
"Hybrid Gas Cup" Research Disclosure, GB, Industrial Opportunities, Ltd., Havant, No. 408, Apr. 1998, p. 432 XP000824641—entire document.

* cited by examiner

*Primary Examiner*—Christopher P. Schwartz
*Assistant Examiner*—Robert A. Siconolfi
(74) *Attorney, Agent, or Firm*—Frishauf, Holtz, Goodman, Langer & Chick, P.C.

(57) ABSTRACT

A gas spring apparatus comprises an outer tube, a cylinder held in the outer tube, and a rod having a piston located in the cylinder. The rod is inserted into the cylinder through a sealing portion. The interior of the cylinder is divided in two, a first liquid chamber situated on the side of the sealing portion and a low-pressure gas chamber situated on the side remoter from the sealing portion, by the piston. A space between the inner surface of the outer tube and the outer surface of the cylinder is divided between a high-pressure gas chamber and a second liquid chamber by a metal bellows. A first liquid chamber and a second liquid chamber communicate with each other by liquid communicating portions. A gas is charged in the high-pressure gas chamber at a higher pressure than in the low-pressure gas chamber.

4 Claims, 3 Drawing Sheets

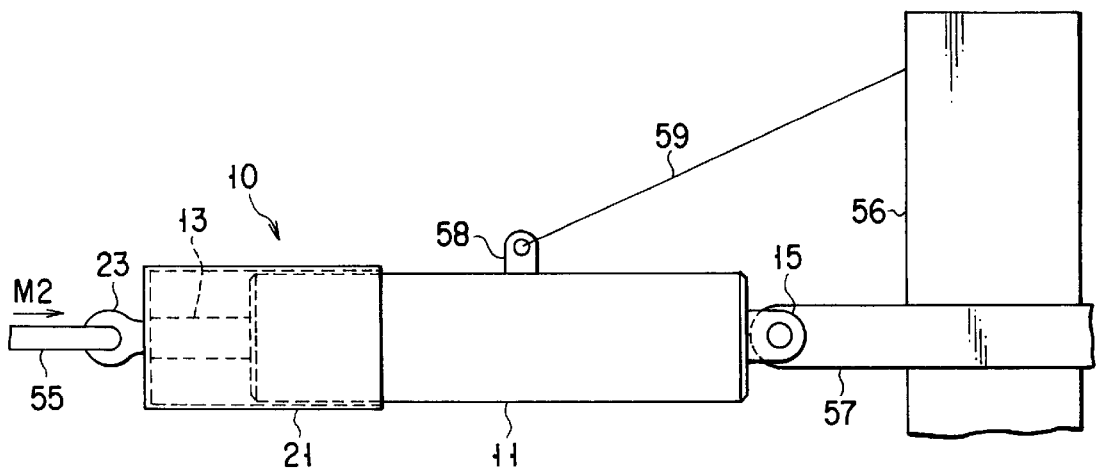
FIG. 2
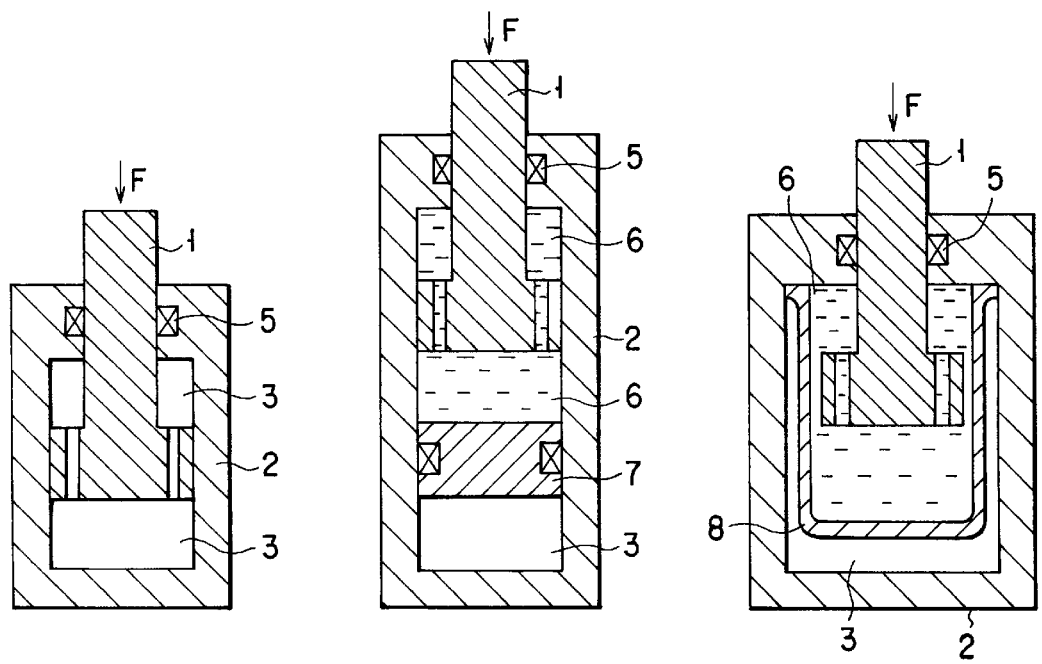
FIG. 4A
(PRIOR ART)
FIG. 4B
(PRIOR ART)
FIG. 4C
(PRIOR ART)

GAS SPRING APPARATUS

CROSS-REFERENCE TO RELATED APPLICATIONS

This application is based upon and claims the benefit of priority from the prior Japanese Patent Application No. 11-194473, filed Jul. 8, 1999, the entire contents of which are incorporated herein by reference.

BACKGROUND OF THE INVENTION

The present invention relates to a gas spring apparatus adapted for use as means for applying tension to a tension wire, such as a trolley wire, aerial electric power line, etc.

FIGS. 4A, 4B and 4C are schematic views individually showing conventional gas spring apparatuses. In any of these prior art examples, a reaction force increases as a rod 1 is caused to get into a cylinder 2 by means of an external force F so that a high-pressure gas in a gas chamber 3 is compressed. These prior art apparatuses are of the compression spring type. In these examples, the rod 1 becomes stationary with respect to the cylinder 2 when the external force F balances with the reaction force that is generated by the pressure in the gas chamber 3.

In general, gases are lower in molecular weight and viscosity than liquids, so that it is harder to seal a gas than to seal a liquid. It is more difficult, in particular, to seal a sliding portion of the rod 1 that is in sliding contact with the cylinder 2.

In a structure designed so that the gas charged in the gas chamber 3 is sealed by means of a sealing portion 5, as shown in FIG. 4A, gas leakage occurs in an early stage in a sliding portion between the rod 1 and the sealing portion 5. Thus, prolonged use of this type is not easy.

Accordingly, the sealing effect of the sealing portion 5 may be improved by sealing a liquid in a liquid chamber 6 that is provided on the side of the sealing portion 5 of the rod 1, as shown in FIG. 4B or 4C. In the example shown in FIG. 4B, the liquid chamber 6 and the gas chamber 3 are divided by means of a free piston 7 that is inserted in the cylinder 2. Since the liquid in the liquid chamber 6 is sealed by means of the sealing portion 5, the sliding portion of the rod 1 can be sealed with ease. In the case of the prior art example shown in FIG. 4C, the same purpose is attained by using an elastic element 8 such as a metallic bellows that is held in the cylinder 2.

Thus, the compression spring type is a dominant type for the conventional gas spring apparatuses. In order to use the compression spring type as a tension spring for a balancer of a trolley wire, for example, however, a load in the direction of pull must be converted into a load in the direction of compression by means of a pull mechanism, an additional measure.

As a known example of the tension spring type, a tension regulating apparatus is described in Jpn. Pat. Appln. KOKOKU Publication No. 6-62070. In this prior art apparatus, the rod side of the internal space of a cylinder is defined as an oil chamber, the opposite side is left open to the atmosphere, and a balancer (accumulator) is separately attached to the oil chamber by means of piping. In this case, the gas pressure in the accumulator is equal to the pressure in the oil chamber. The tension increases as this pressure acts on a plunger so that the rod is pulled externally. Thus, the apparatus has a structure of the tension spring type.

However, the structure of the tension spring type involves the following problems.

(1) Since the accumulator having a high-pressure gas sealed therein is required besides the cylinder, the projected area of the apparatus is wider, so that installation requires a wider space. Further, the gross weight of the apparatus is heavier by a margin corresponding to the weight of the accumulator.

(2) Since the gas in the accumulator is sealed by means of an elastic rubber bag or free piston, aging of rubber causes gas leakage, resulting in lowering of performance. It is difficult, therefore, to use the apparatus maintenance-free for a long period of time.

(3) Since the atmosphere side of the cylinder is in contact with the open air, rusting is liable to occur.

A tensioning apparatus of the gas spring type is described in Jpn. Pat. Appln. KOKAI Publication No. 6-16068. Since this tensioning apparatus is of the compression spring type, however, it inevitably becomes complicated in construction, bulky, and heavy if it is designed to be of the tension spring type, thus leaving room for improvement.

BRIEF SUMMARY OF THE INVENTION

Accordingly, the object of the present invention is to provide a high-durability gas spring apparatus of tension-type, which can be designed to be compact and lightweight and can be used without suffering gas leakage for a long period of time.

In order to achieve the above object, a gas spring apparatus according to the present invention comprises an outer tube, a cylinder held in the outer tube and having a proximal end portion fixed to the outer tube and a closed distal end face, a rod inserted into the outer tube through a hole in an end wall of the outer tube and having a distal end portion projecting inside the cylinder and a proximal end portion projecting outside the outer tube, a sealing portion provided on that part which is penetrated by the rod of the outer tube, a piston provided on the distal end portion of the rod and dividing the interior of the cylinder between a first liquid chamber situated on the side of the sealing portion and a low-pressure gas chamber situated on the side remoter from the sealing portion, and a partition member dividing the interior of the outer tube between a high-pressure gas chamber and a second liquid chamber. The first liquid chamber in the cylinder and the second liquid chamber in the outer tube are internally connected, and a gas is charged in the high-pressure gas chamber at a higher pressure than in the low-pressure gas chamber.

In the gas spring apparatus of the invention constructed manner, the pressure in the high-pressure gas chamber causes the liquids in the liquid chambers to generate a force that pulls the rod into the cylinder. When a force that pulls out the rod from the cylinder acts on the rod, the liquid in the first liquid chamber moves toward the second liquid chamber, and the capacity of the high-pressure gas chamber is reduced by a margin corresponding to the volume of the moved portion of the liquid, so that the pressure increases. If the pressure in the high-pressure gas chamber increases, liquid pressures in the liquid chambers also increase, so that a reaction force that acts on the rod is enhanced. Based on the operation described above, this gas spring apparatus can function as a tension-type gas spring apparatus.

According to the present invention, there may be provided a tension-type gas spring apparatus in which a load in the direction of pull can be applied directly to the rod. Since the high-pressure gas chamber and the liquid chambers are arranged in the outer tube, moreover, the apparatus can be made compact and lightweight. Since the sealing portion of this gas spring apparatus seals the liquids, sealing is easy, and the sealing effect can be enhanced. Since the low-pressure gas chamber in the cylinder is closed, furthermore, the problem of rusting in the cylinder can be solved.

Preferably, the partition member of the invention is formed of a metal bellows that can extend and contract in the axial direction of the outer tube. According to this invention, a high-pressure gas can be hermetically sealed by means of the outer tube, metal bellows, etc., and the apparatus can be used maintenance-free without suffering gas leakage for a long period of time.

According to the present invention, moreover, the outer tube and the rod may be connected to a tension line, such as a trolley wire or aerial electric power line, and a tension line supporting member, respectively, or to the supporting member and the tension line, respectively. In this case, the tension line is subjected to a force such that the rod is pulled into the cylinder by means of the pressure in the high-pressure gas chamber. According to this invention, there may be provided a tension-type gas spring apparatus capable of applying an appropriate tension to a tension line such as a trolley wire as well as enjoying the aforementioned effects.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a side view showing an example of application of the gas spring apparatus shown in FIG. 1;

FIG. 4A is a sectional view of a first prior art gas spring apparatus;

FIG. 4B is a sectional view of a second prior art gas spring apparatus; and

FIG. 4C is a sectional view of a third prior art gas spring apparatus.

DETAILED DESCRIPTION OF THE INVENTION

Figure 1:
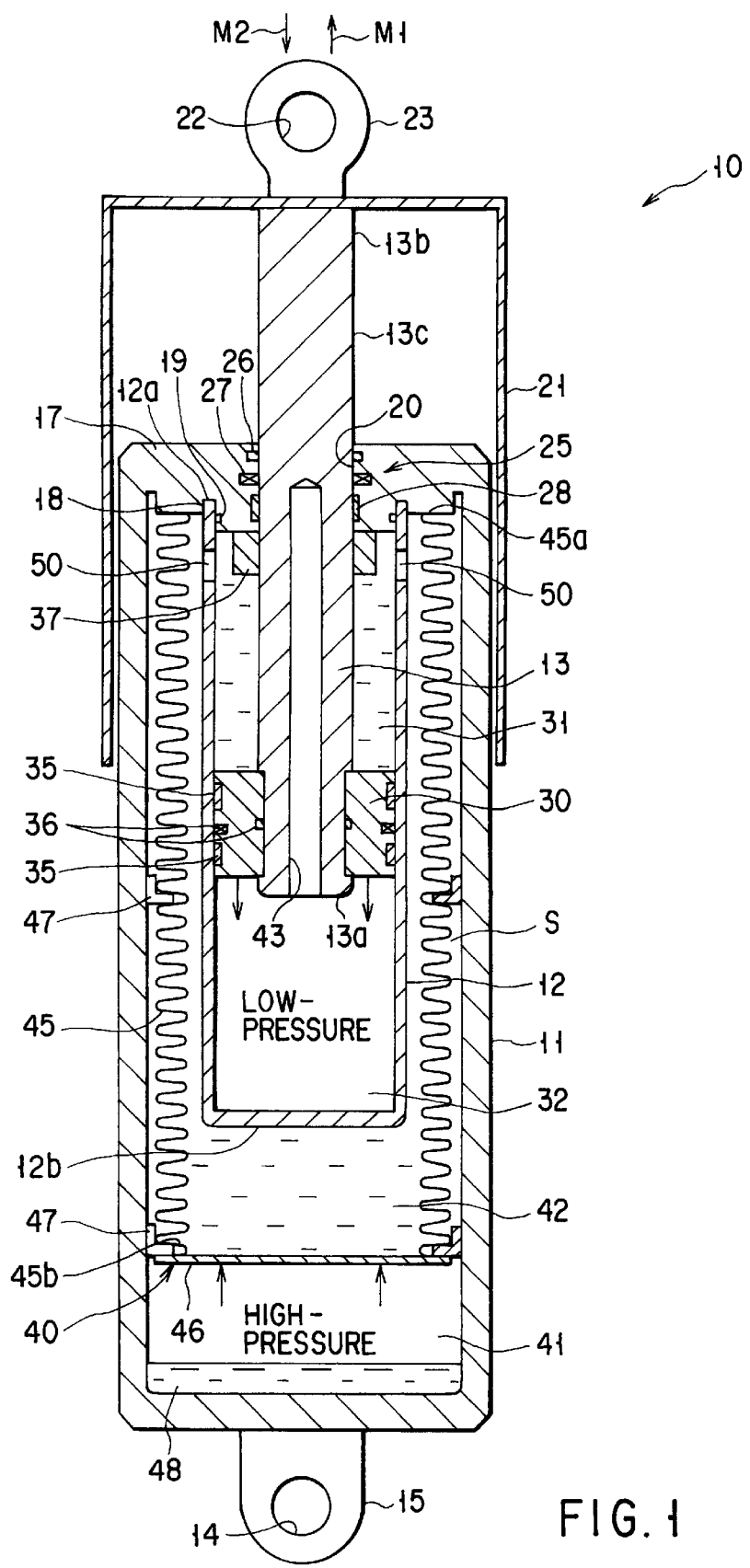
FIG. 1 is a sectional view of a gas spring apparatus according to a first embodiment of the present invention.

A first embodiment of the present invention will now be described with reference to the accompanying drawings of FIGS. 1 and 2. A gas spring apparatus 10 shown in FIG. 1 comprises a cylindrical outer tube 11, a cylinder 12 held in the tube 11, a rod 13 inserted in the cylinder 12, etc. The tube 11, cylinder 12, and rod 13 are arranged on the same axis (or coaxial) with one another. The surface of the outer tube 11 is treated with rust preventing treatment, such as molten zinc plating, in order to secure corrosion resistance. A joint 15 having a fitting hole 14 or the like is provided on the outer end of the outer tube 11.

A proximal end portion 12a of the cylinder 12 in the outer tube 11 is fixed to an end wall 17 of the tube 11. In the case of this embodiment, the proximal end portion 12a of the cylinder 12 is fixed to the end wall 17 with its thread portion 18 screwed in the wall 17, and is sealed by means of a sealing element 19 such as an O-ring. Alternatively, the proximal end portion 12a of the cylinder 12 may be fixed to the end wall 17 by welding. A distal end face 12b of the cylinder 12 is closed. The axial length of the cylinder 12 is shorter than the length of the outer tube 11.

The rod 13 is inserted into the outer tube 11 through a through hole 20 that is formed in the end wall 17 of the outer tube 11. A distal end portion 13a of the rod 13 projects inside the cylinder 12. A proximal end portion 13b of the rod 13 projects from the end wall 17 to the outside of the outer tube 11. A portion 13c of the rod 13 that projects outward from the end wall 17 is concealed under a cylindrical metallic cover 21 that serves as a measure to prevent external damaging. A joint 23 having a fitting hole 22 or the like is provided on the outer end of the rod 13.

A sealing portion 25 is provided in the region where the rod 13 penetrates the outer tube 11, and more specifically, on the inner surface of the through hole 20 in the end wall 17 of the tube 11. The sealing portion 25 is a dual-structure seal that includes a low-pressure seal 26 that is situated on the atmosphere side and a high-pressure seal 27 that is situated deeper in the cylinder 12, for example. A bearing 28 is located deeper (or nearer to a liquid chamber 31) than the high-pressure seal 27. The bearing 28 serves to support a diametrical load that acts on the rod 13 and to guide the rod 13 in a manner such that it can move smoothly in the axial direction of the outer tube 11.

A piston 30 is provided on the distal end portion 13a of the rod 13. The piston 30 divides the interior of the cylinder 12 in two, a first liquid chamber 31 that is situated on the side of the sealing portion 25 (or on the side of the through hole 20) and a low-pressure gas chamber 32 that is situated remoter from the sealing portion 25. The first liquid chamber 31 contains a liquid such as oil therein. Since the sealing portion 25 seals the liquid in the chamber 31, sealing is easier and the sealing effect is higher than in the case where a gas is sealed.

A bearing 35 and a sealing member 36 are arranged on the outer periphery of the piston 30. The bearing 35 serves to support a diametrical load that acts on the piston 30 and to guide the piston 30 in a manner such that it can move smoothly in the axial direction of the cylinder 12. The sealing member 36 serves to divide the first liquid chamber 31 and the low-pressure gas chamber 32 without causing leakage between them. The first liquid chamber 31 is provided with a stopper 37 for preventing an excessive stroke on the extension side of the rod 13.

The low-pressure gas chamber 32 has a closed structure that is isolated from the atmosphere in order to prevent rusting in the cylinder 12. When the rod 13 moves to the extension side (in the direction indicated by arrow M1 in FIG. 1), in this case, the piston 30 also moves in the same direction, so that the capacity of the closed chamber 32 increases. In order to prevent the chamber 32 from being evacuated as this is done, it is advisable to seal a dry inert low-pressure gas, such as nitrogen of about 0.1 MPa, in the chamber 32. Since the low-pressure gas chamber 32 is hermetically closed in this manner, it can never be open to the atmosphere. Thus, the ambient conditions (e.g., moisture) can be prevented from affecting the interior of the cylinder 12.

A partition member 40 is located in a space S that is defined between the inner surface of the outer tube 11 and the outer surface of the cylinder 12. The member 40 divides the space S in two, a high-pressure gas chamber 41 and a second liquid chamber 42. The second liquid chamber 42 contains therein the same liquid, e.g., oil, the first liquid chamber 31 does.

A gas of a higher pressure than that of the gas in the low-pressure gas chamber 32 is charged in the high-pressure gas chamber 41. In the case of this embodiment, the rod 13 is formed having a port 43 that opens into the low-pressure gas chamber 32. The gas is externally introduced into the chamber 32 through the port 43. A chemically inert high-pressure gas, such as nitrogen gas, is introduced into the high-pressure gas chamber 41 through a gas supply port (not shown).

By way of example, the partition member 40 is a metal bellows 45 that can extend and contract in the axial direction of the outer tube 11 and the cylinder 12. One end 45a of the bellows 45 is fixed liquid-tight to the end wall 17 of the outer tube 11 by welding or the like. The interior of the bellows 45 is hermetically sealed in a manner such that a cap 46 is fixed liquid-tight to the other end 45b or the free end side of the bellows 45 by welding or the like.

By way of example, the metal bellows 45 is an integrally-formed bellows that is obtained by forming a thin metal pipe of austenitic stainless steel with a thickness of about 0.1 mm to 0.3 mm. The high-pressure gas chamber 41 is a closed space that is defined by the respective outer surfaces of the bellows 45 and the cap 46 and the inner surface of the outer tube 11. Since the gas in the high-pressure gas chamber 41 is fully sealed by means of the outer tube 11, bellows 45, and cap 46, there is no possibility of gas leakage that is attributable to aging.

A guide 47 of a synthetic resin that has low frictional resistance and high wear resistance is provided on the outer surface of the metal bellows 45 in order to prevent the bellows 45 from being worn or broken as it touches the inner surface of the outer tube 11. If necessary, a suitable quantity of liquid 48 is stored in the high-pressure gas chamber 41 in order to adjust the substantial internal capacity of the chamber 41 and make the slide of the guide 47 on the outer tube 11 smooth.

The first liquid chamber 31 of the cylinder 12 and the second liquid chamber 42 inside the outer tube 11 communicate with each other by means of liquid communicating portions 50 such as through holes. Thus the liquids in the liquid chambers 31 and 42 are allowed to flow into each other through the communicating portions 50.

The following is a description of the operation of the gas spring apparatus 10 constructed in this manner.

The wall of the bellows 45 is as thin as about 0.1 mm to 0.3 mm, and is nonresistant to pressure and extensible or contractible. Therefore, the pressure of the liquid in the second liquid chamber 42 in the bellows 45 is equal to the pressure of the gas sealed in the high-pressure gas chamber 41. Accordingly, a force that acts on the rod 13 is generated by means of the gas pressure in the chamber 41. A liquid pressure that acts on the first liquid chamber 31 causes the piston 30 to move toward the low-pressure gas chamber 32. Thus, the pressure in the high-pressure gas chamber 41 causes the liquids in the liquid chambers 31 and 42 to generate a force (force in the direction indicated by arrow M2 in FIG. 1) that pulls the rod 13 into the cylinder 12.

When a force (force in the direction indicated by arrow M1) that pulls out the rod 13 from the cylinder 12 acts on the rod 13, the liquid in the first liquid chamber 31 in the cylinder 12 moves through the liquid communicating portions 50 to the outside of the cylinder 12, that is, toward the second liquid chamber 42. The metal bellows 45 extends toward the high-pressure gas chamber 41 by a margin corresponding to the volume of the moved portion of the liquid. In consequence, the capacity of the chamber 41 is reduced, so that the pressure increases. Thereupon, P×V becomes constant (P: gas pressure, V: gas volume).

If the pressure in the high-pressure gas chamber 41 increases, liquid pressures in the liquid chambers 31 and 42 also increase, so that a reaction force that acts on the rod 13 is enhanced.

When the rod 13 is pulled by the operation described above, a load in the direction of arrow M1 is augmented corresponding to the pulling force. Thus, the gas spring apparatus 10 can function as a tension-type spring.

FIG. 2 shows an example in which the gas spring apparatus 10 is used as a tension regulating apparatus (balancer) for a trolley wire. In the case of this embodiment, the joint 23 that serves as a first bracket on the rod 13 is connected to a trolley wire 55 as an example of a tension line. The joint 15 that serves as a second bracket on the outer tube 11 is connected to a trolley wire supporting member 57 that is attached to a support structure 56 such as a utility pole. Further, a third bracket 58 on the top surface of the outer tube 11 is connected to a supporting member 59 such as a wire, and the weight of the gas spring apparatus 10 is supported by the support structure 56.

The pressure of the high-pressure gas in the high-pressure gas chamber 41 urges the rod 13 in a direction (direction of arrow M2) such that it is pulled into the outer tube 11, and this urging force applies a given tension to the trolley wire 55.

The trolley wire 55, which can be extended or contracted by temperature change, may probably sag due to reduction in tension or suffer trouble such as disconnection that is attributable to excessive tension. Conventionally, therefore, various automatic tension balancers have been proposed and put to practical use.

The following is a description of the principle of automatic tension balancing using the gas spring apparatus 10.

The gas sealed in the high-pressure gas chamber 41 is based on a state equation given by $$\{(P \times V)/T\} = \text{constant}, \tag{a}$$

where P, V, and T are pressure, volume, and temperature, respectively.

According to equation (a), to the pressure P or volume V varies as the temperature T changes. If the degree of extension or contraction of the rod 13 that is obtained when the capacity of the high-pressure gas chamber 41 is changed with the temperature change is made equal to that of the trolley wire based on the temperature change, the tension of the wire can be kept constant despite the temperature change.

In order to keep the tension constant despite the temperature change, the volume V of the gas sealed in the high-pressure gas chamber 41 is set as follows:

$$V = A \times L \times \alpha \times T, \tag{b}$$

where A, L, α, and T are the difference between the respective sectional areas of the rod 13 and the piston 30, length of the trolley wire, linear expansion coefficient of the wire, absolute temperature, respectively.

In consideration of the expansion of the liquids in the liquid chambers 31 and 42, moreover, the gas volume is given by $$V = \{(A \times L \times \alpha) - (V_{oil} \times \beta)\} \times T, \quad \text{(c)}$$

where $V_{oil}$ and $\beta$ are the volume and the coefficient of volume expansion of the liquids.

Based on the gas volume V obtained in this manner, the tension of the trolley wire 55 can be kept constant without regard to the temperature change. In contrast with the case of the foregoing embodiment, the joint 15 of the outer tube 11 and the joint 23 of the rod 13 may be connected to a tension line (e.g., trolley wire 55) and the trolley wire supporting member 57, respectively.

Figure 3:
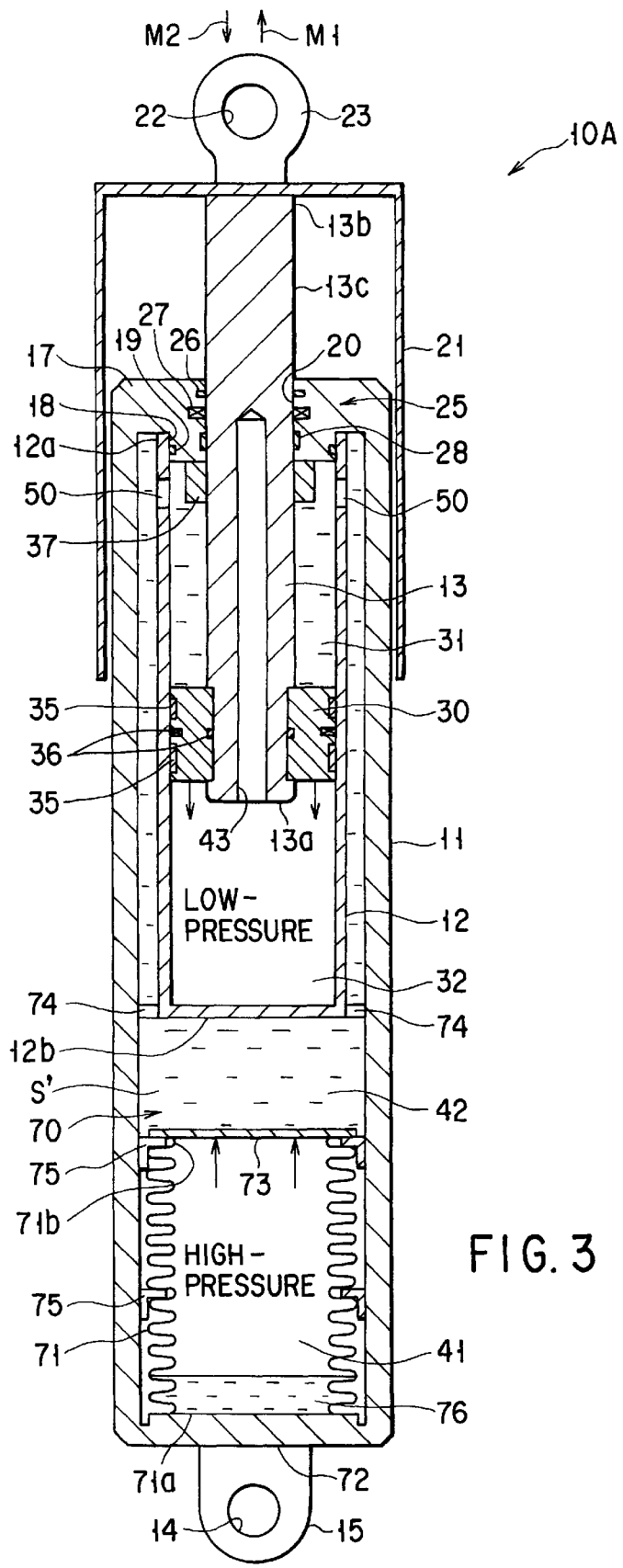
FIG. 3 is a sectional view of a gas spring apparatus according to a second embodiment of the invention.

FIG. 3 shows a gas spring apparatus 10A according to a second embodiment of the invention. In the description of the gas spring apparatus 10A to follow, common reference numerals are used to designate common portions that share the construction and operation with those of the gas spring apparatus 10 of the first embodiment, and a description of those portions is omitted. The following is a description of differences between the two embodiments.

In the gas spring apparatus 10A of the second embodiment, the outside diameter of a metal bellows 71 that constitutes a partition member 70 is made smaller than the metal bellows 45 of the first embodiment, and the bellows 71 is arranged in series on an extension of a cylinder 12 in the axial direction thereof, in order to reduce the outer diameter of an outer tube 11. The partition member 70, which includes the metal bellows 71, is held in a space S' that is defined between the inner surface of the outer tube 11 and a distal end face 12b of the cylinder 12. The member 70 divides the interior of outer tube 11 in two, a high-pressure gas chamber 41 and a second liquid chamber 42.

By way of example, the partition member 70 uses the metal bellows 71 that can extend and contract in the axial direction of the outer tube 11. One end 71a of the bellows 71 is fixed liquid-tight to an end wall 72 of the outer tube 11 by welding or the like. The interior of the bellows 71 is hermetically sealed in a manner such that a cap 73 is fixed liquid-tight to the other end 71b or the free end side of the bellows 71 by welding or the like.

By way of example, the metal bellows 71 is an integrally-formed bellows that is obtained by forming a thin metal pipe of austenitic stainless steel with a thickness of about 0.1 mm to 0.3 mm. The high-pressure gas chamber 41 is a closed space that is defined by the respective inner surfaces of the bellows 71 and the cap 73 and the end wall 72. A chemically inert high-pressure gas, such as nitrogen gas, is charged in the chamber 41 under a higher pressure than in the low-pressure gas chamber 32. The second liquid chamber 42 is defined by the outer surface of the metal bellows 71. The second liquid chamber 42 communicates with a first liquid chamber 31 by means of liquid communicating portions 74 and 50.

A guide 75 of a synthetic resin that has low frictional resistance and high wear resistance is provided on the outer surface of the metal bellows 71 in order to prevent the bellows 71 from being worn or broken as it touches the inner surface of the outer tube 11. A suitable quantity of liquid 76 is stored in the high-pressure gas chamber 41 in order to adjust the internal capacity of the chamber 41.

In the gas spring apparatus 10A of the second embodiment constructed in this manner, as in the gas spring apparatus 10 of the first embodiment, the pressure in the high-pressure gas chamber 41 acts through liquids in the liquid chambers 31 and 42 in a direction (direction indicated by arrow M2 in FIG. 3) such that the rod 13 is pulled into the cylinder 12. When the rod 13 moves in a direction (direction indicated by arrow M1) such that it projects from the cylinder 12, the liquid in the first liquid chamber 31 moves through the liquid communicating portions 50 and 74 toward the second liquid chamber 42, and the high-pressure gas chamber 41 is compressed by a margin corresponding to the volume of the moved portion of the liquid. In consequence, the capacity of the chamber 41 is reduced to increase the pressure, so that a reaction force (force in the direction of arrow M2) that acts on the rod 13 is enhanced.

Based on the operation described above, the gas spring apparatus 10A can also function as a tension-type spring. In this apparatus 10A, moreover, the cylinder 12 and the partition member 70 are arranged in series with each other, so that the outside diameter of the metal bellows 71 can be further reduced, and therefore, the outside diameter of the apparatus 10A can be reduced. It is to be understood that the gas spring apparatus 10A, like the gas spring apparatus 10 of the first embodiment, can be used as a tension regulating apparatus (tension balancer) for urging a tension line such as a trolley wire or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gas spring apparatus comprising:

an outer tube including an end wall formed having a hole;

a cylinder held in the outer tube and having a cylindrical peripheral wall, a proximal end portion fixed to the outer tube, and a closed distal end face opposite the proximal end portion;

a rod inserted into the outer tube through the hole in the end wall of the outer tube and having a distal end portion projecting inside the cylinder and a proximal end portion projecting outside the outer tube;

a sealing portion provided on the inner periphery of the hole in the outer tube into which the rod is inserted;

a piston provided on the distal end portion of the rod and dividing the interior of the cylinder between a first liquid chamber situated on a side of the sealing portion and a low-pressure gas chamber situated on a side remote from the sealing portion, wherein the low-pressure gas chamber is defined by the cylindrical peripheral wall, the distal end face of the cylinder and the piston, and the low-pressure gas chamber is charged with an inert gas whose pressure is higher than an atmospheric pressure;

a metal bellows capable of extension and contraction in an axial direction of the outer tube and dividing the interior of the outer tube between a second liquid chamber and a high pressure gas chamber in which a gas is charged at a higher pressure than in the low-pressure gas chamber; and a liquid communicating portion internally connecting the first liquid chamber in the cylinder and the second liquid chamber in the outer tube.

2. A gas spring apparatus according to claim 1, wherein said outer tube and said rod are connected to a tension line and a supporting member, respectively, or to the supporting member and the tension line, respectively, and a tension is applied to the tension line in a manner such that the rod is pulled into the cylinder by means of the pressure in the high-pressure gas chamber.

3. A gas spring apparatus according to claim 1, wherein said outer tube and said rod are connected to a trolley wire and a trolley wire supporting member, respectively, or to the trolley wire supporting member and the trolley wire, respectively, and a tension is applied to the trolley wire in a manner such that the rod is pulled into the cylinder by means of the pressure in the high-pressure gas chamber.

4. A gas spring apparatus according to claim 1, wherein the cylinder is housed in the metal bellows, the high-pressure gas chamber is defined by an outer surface of the metal bellows and an inner surface of the outer tube, and the second liquid chamber is defined by an inner surface of the metal bellows and an outer surface of the cylinder.

* * * * *